Patented Nov. 7, 1950

2,528,937

UNITED STATES PATENT OFFICE 2,528,937

WRINKLING OILS

Gordon M. Williams, Glens Falls, N. Y., assignor to New Wrinkle, Inc., Dayton, Ohio, a corporation of Delaware No Drawing. Original application May 6, 1943, Serial No. 485,897. Divided and this application April 9, 1947, Serial No. 740,480

6 Claims. (Cl. 260—407)

This invention relates to drying oils having the property of yielding wrinkle films when compounded with resins and driers to form a varnish and applied to a surface and dried.

More particularly, the present invention relates to means whereby polymerization nuclei may be initially formed whereby to improve or increase the drying rate and wrinkle forming properties of drying oils by treatment according to the present invention.

In the formation of surface wrinkles on a coating composition it is important that there be developed a considerable degree of strain caused by contraction or expansion, or both, between the surface layer and the body of the drying film. While the mechanism of drying of coating films is not clearly understood, it is believed to include polymerization (see Bennett's Driers and Drying, page 5, 1941, published by Chemical Publishing Company, Brooklyn, New York). Apparently, this contraction or expansion of the surface layer is a condition established by the initial formation of polymerized nuclei on the surface of the coating film to form a thin skin and the subsequent polymerization of the underlayers. This tends to set up the required strain and causes the formation of the wrinkle texture or pattern. It is thus apparent that acceleration of the rate of formation of polymerized units, first on the surface layer and finally throughout the coating film, will aid materially in the speedy formation of the wrinkle texture or pattern which is desired. Furthermore, it is reasonable to assume that the more closely knit the polymerized associations are, the more uniform and pronounced will be the resulting wrinkle pattern or texture.

The exact manner in which the molecules of a drying oil orient themselves and interreact is not known. However, there is considerable evidence to indicate that polar bodies are first formed by the introduction of oxygen into the points of unsaturation. These polar molecules are then able to polymerize and form nuclei for further polymerization, and this gradual polymerization of polar molecules leads ultimately to the hardening of the coating film.

Furthermore, it is understood that the difference in drying characteristics between tung oil (China-wood oil) and other oils such as linseed oil is largely due to the fact that the former by virtue of its high degree of conjugation and symmetry is able to form a closely knit three dimensional polymerized nucleus. Linseed oil and other similar oils, on the other hand, form drawn out polymerized units which are comparatively loosely knit.

The present invention deals particularly with means whereby the initial formation of polymerizing nuclei may be established in drying oils which are normally non-wrinkling in order to accelerate their drying rate and to improve and fully develop their wrinkle forming characteristics. This is brought about particularly by the introduction in said oils of organometallic compounds and metallic ions which serve to initiate polymerization and which tend largely to eliminate the necessity for the initial formation of polar bodies by means of oxidation of the oil. For example, linseed oil and soya bean oil are considered to be normally non-wrinkling oils; however, if these oils are subjected to blowing they are readily transformed into wrinkling oils and the reason for this transformation is believed to be the formation of polar bodies due to the partial oxidation or the introduction of oxygen in the oil molecules.

It should be noted carefully that the selection of the metallic ion, as well as the corresponding organo radical is of considerable importance and will lead to great variations in the results to be attained.

It is reasonable to expect, however, that most of the metals will react under the proper conditions. In some cases it may be necessary to use a catalyst and possibly a preliminary addition reaction in order to accomplish the correct attachment of the metallic ion to the olefinic bond.

It is important to note here the difference between the construction of an oil molecule treated in this manner and the ordinary drier composition generally used in the art to accelerate drying of oils. In this case the metallic ions are attached to one or more carbons at their initial points of unsaturation either by means of organometallic compound or other chemical reactions which will serve to orient the metallic ion to this position, while in ordinary driers the metallic ion is reacted with the acid group to form a C-O-M composition. The resulting difference in the polymerization is quite marked since the C-M linkage allows a much closer network of interreacting molecules than that experienced by any polymerization caused by driers of the general type now employed in the art.

Of principal importance in the selection of an organo group is the formation of an organometallic compound which will unite readily with the oil to allow the initial polymerization. For the most part aliphatic groupings appear to be most satisfactory although in some cases aromatic and alicyclic radicals yield more desirable results.

Organometallic compounds of the type employed according to the present invention are of the general formula RM where the R represents an aliphatic, aromatic or alicyclic radical which may or may not contain unsaturated linkages. The M may represent any one of a number of metallic ions which will form a suitable nucleus for polymerization.

By way of illustration and without thereby intending to limit the present invention, there is given below a diagrammatic presentation of the manner in which a small amount of these compounds can initiate polymerization of the oil molecule. The oleic acid radical and a simple organometallic compound are used.

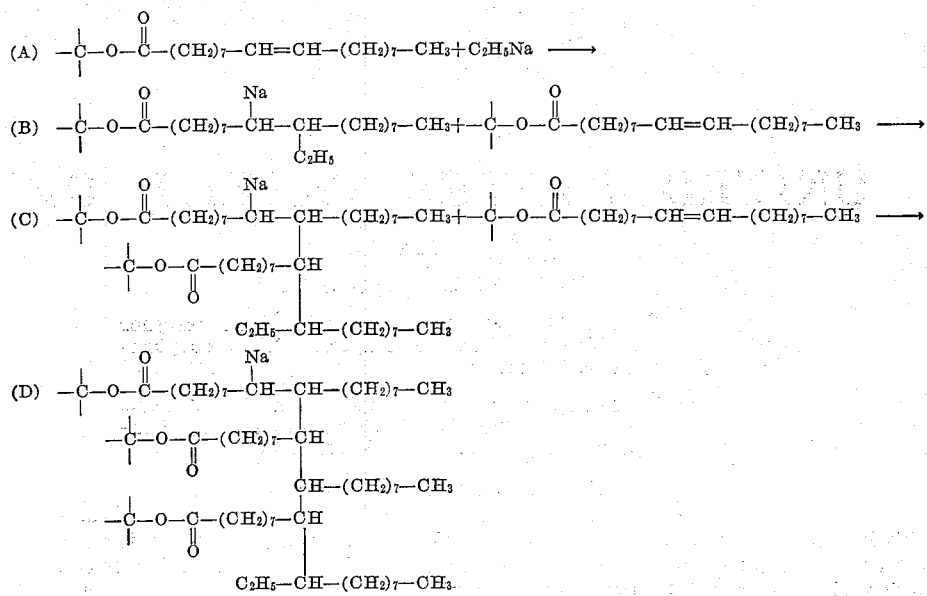

From this simple illustration it is interesting to picture the complexity involved when a triglyceride made up of acid radicals containing more than one unsaturated bond is treated with an organometallic compound.

As has been mentioned hereinbefore, it may be desirable in some cases to add the metallic ion to the olefin linkage by means other than through the use of the organometallic unit. The alkali metals, for instance, will add directly into the double bond and the resulting polymerization is similar to that pictured above. The initial stages of such a reaction may be illustrated as follows using the linolic acid radical and potassium:

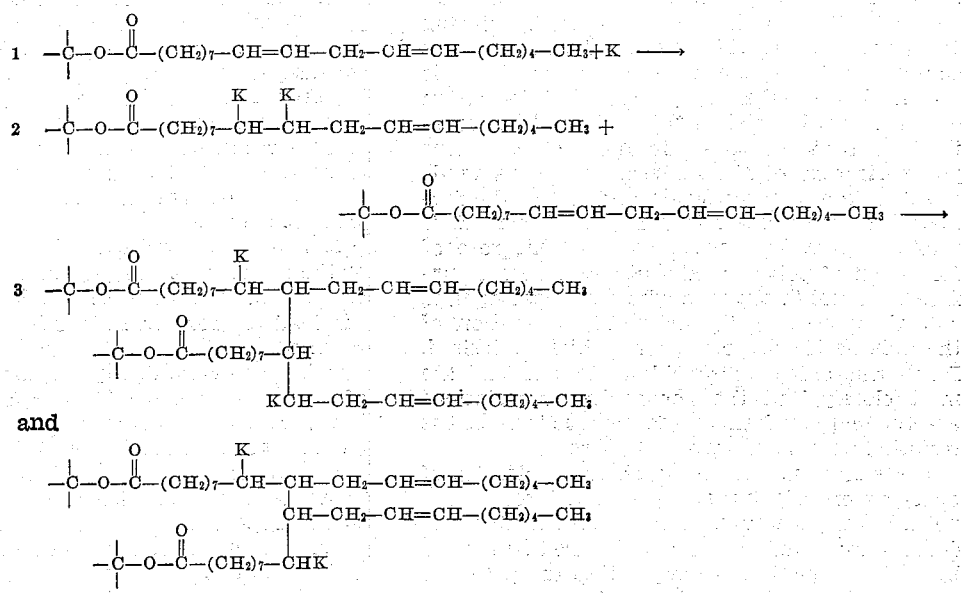

The above reactions indicate that only one double bond added the metal. It will be understood, of course, that undoubtedly there will be molecules in which the metal has added to both points of unsaturation.

The fundamental principles of the present invention are applicable to the treatment of other esters of drying oils besides the triglyceride formation. Typical of these are those obtained by the reaction of unsaturated fatty acids with monohydric alcohols and other polyhydric alcohols than trihydric. These substances possess potential drying properties which may be developed under proper conditions and which, with the aid of the polymerizing nucleus which results from the practice of the present invention will harden and produce suitable films.

Further, by way of illustration, and without thereby intending to limit the present invention, the following examples are given:

Example I 100 grams of linseed oil are placed in a suitable container provided with a cover, a gas inlet for furnishing a blanket of inert gas over the surface of the oil, a suitable condenser for condensing inflammable volatile matter, and a stirring device. Nitrogen gas is then introduced through the inlet at a slow but constant rate and 0.12 gram of $CsC_2H_5$ in 20 grams of diethyl ether is added. The stirrer is started and the contents allowed to react at room temperature for approximately 4 hours. The heat is then increased to approximately 50° C. for the removal of the ether and then to 200° C. at which temperature it is held for a period of about 4 hours until a rather viscous oil results. The nitrogen supply is shut off approximately 1 hour prior to the completion of the cook.

The resulting product is a viscous oil possessing a highly increased drying rate and wrinkle forming properties which when compounded with resin and driers as is customary in the art will produce a coating composition which will yield a well defined uniform wrinkle film on application and drying.

Example II 50 grams of an esterified mixture of linseed oil fatty acids and ethylene glycol are placed in a container such as described in Example I. 0.2 gram of $Co(CH_2-CH=CH_2)_2$ in 20 grams of diethyl ether are then added to the container. Nitrogen is introduced to provide an inert blanket over the mixture and the stirrer is started. The contents are allowed to react for approximately 2 hours at room temperature and the temperature is then increased to approximately 50° C. for the removal of the ether and then to approximately 250° C. The mixture is maintained at this temperature for about 2 hours and 50 grams of the original ester is then added. At this point the temperature will rapidly drop, and it is then increased to 200° C. and kept at this level until the oil is quite viscous.

The product resulting from this treatment may be used in the usual manner in compounding wrinkle coating compositions and will produce results not unlike those obtained with the product of Example I.

Example III 100 grams of soya bean oil are placed in a container such as described in Example I and 0.15 gram of $Pb(C_3H_7)_2$ added, and the mixture treated in the manner described in Example I. After the removal of the ether, however, the temperature is increased to 300° C. and maintained at that level for approximately 8 hours or until the oil reaches the desired degree of viscosity. The inert blanket of nitrogen is maintained throughout this treatment.

The product resulting from this treatment may be used in the same manner and will exhibit the same properties as the products resulting from the treatment of Examples I and II.

Example IV 100 grams of soya bean oil are placed in a container such as described in Example I. A blanket of nitrogen is thrown over the surface of the oil while the latter is heated to a temperature of 120° C. to remove any water which may be present. The oil is then cooled to 0° C. with an ice and salt mixture and 0.05 gram of sodium added. The mixture is then allowed to warm up to room temperature with constant stirring. When no further reaction is evident the oil is heated to 120° C. with constant agitation and under a blanket of nitrogen. The temperature is held at this point for approximately 30 minutes.

The resulting product may be utilized in the customary manner for producing a wrinkle varnish composition.

Example V

To 100 grams of sunflower oil 0.15 gram of finely divided copper is added in the manner described in Example IV with the exception that the copper may be added at room temperature instead of at 0° C. The oil is then heated to 150° C. and held at that temperature for 3 hours with constant stirring and under a blanket of nitrogen.

The resulting product when compounded with resins and driers in a varnish coating composition and applied and dried will exhibit better drying properties and wrinkling characteristics than similar compositions prepared from the untreated oil.

It will be understood that the foregoing examples are illustrative of the application of the method of the present invention, and that it is not intended to have the present invention limited to or circumscribed by the particular details of procedure, materials, or apparatus therein set forth or described in view of the fact that the present invention is susceptible to modifications depending on individual preference and conditions without departing from the spirit of this disclosure and the scope of the appended claims.

This application is a division of my copending application, Serial No. 485,897, filed May 6, 1943, now Patent No. 2,428,901, which in turn is a continuation-in-part of application, Serial No. 485,646, filed May 4, 1943, now Patent No. 2,431,357.

I claim:

1. A wrinkling oil consisting of the product obtained by addition of 0.05 part by weight of sodium to 100 parts by weight of vegetable fatty oils, and heating to 120° C. in an inert ambient atmosphere.

2. A wrinkling oil consisting of the product obtained by addition of 0.05 part by weight of sodium to 100 parts by weight of soya bean oil, and heating to 120° C. in an inert ambient atmosphere.

3. A wrinkling oil consisting of the product obtained by heating 100 parts by weight of sunflower oil with 0.05 part by weight of sodium at a maximum temperature of 150° C.

4. A wrinkling coating composition comprising resin, drier and a wrinkling oil consisting of the product obtained by heating 100 parts by weight of sunflower oil with 0.05 part by weight of sodium at a maximum temperature of 150° C.

5. A wrinkling coating composition comprising resin, drier and a wrinkling oil consisting of the product obtained by addition of 0.05 part by weight of sodium to 100 parts by weight of vegetable fatty oils, and heating to 120° C. in an inert atmosphere.

6. A wrinkling coating composition comprising resin, drier and a wrinkling oil obtained by addition of 0.05 part by weight of sodium to 100 parts by weight of soya bean oil, and heating to 120° C. in an inert atmosphere.

GORDON M. WILLIAMS.

REFERENCES CITED

The following references are of record in the file of this patent:

UNITED STATES PATENTS

| Number | Name | Date |
|---|---|---|
| 1,745,877 | Thurman | Feb. 4, 1930 |
| 1,831,323 | Root | Nov. 10, 1931 |
| 1,883,408 | Root | Oct. 18, 1932 |
| 1,891,203 | Ambros et al. | Dec. 13, 1932 |
| 2,219,862 | Bradley | Oct. 29, 1940 |
| 2,244,666 | Auer | June 10, 1941 |
| 2,387,424 | Waldie | Oct. 23, 1945 |
| 2,418,453 | Auer | Apr. 8, 1947 |
| 2,423,751 | Bernstein | July 8, 1947 |

FOREIGN PATENTS

| Number | Country | Date |
|---|---|---|
| 366,520 | Great Britain | Feb. 1, 1932 |